United States Patent

[11] 3,611,929

| [72] | Inventors | Kurt Schrotz<br>Brentanastrasse 29B, Hirschorn/Neckar;<br>Werner Becker, 6932 Hirschorn,<br>Itaupstrasse 25, Hirschorn, both of<br>Germany |
|---|---|---|
| [21] | Appl. No. | 849,030 |
| [22] | Filed | Aug. 11, 1969 |
| [45] | Patented | Oct. 12, 1971 |
| [32] | Priority | Aug. 14, 1968 |
| [33] | | Germany |
| [31] | | P 17 86 068.3 |

[54] LABEL DISPENSING APPARATUS
20 Claims, 8 Drawing Figs.

[52] U.S. Cl. .................................................. 101/292,
226/82, 226/86, 226/127, 226/157
[51] Int. Cl. .................................................. B41f 1/08
[50] Field of Search ........................................ 226/76, 82,
86, 87, 127, 129, 157; 101/292; 156/384

[56] References Cited
UNITED STATES PATENTS

| 2,275,262 | 3/1942 | Malhiot | 226/76 X |
| 2,552,255 | 5/1951 | Capstaff | 226/87 X |
| 2,781,841 | 2/1957 | Dignan | 226/82 X |
| 3,310,636 | 3/1967 | D'Arcy | 226/76 X |
| 3,465,937 | 9/1969 | Gruver | 226/76 |

Primary Examiner—Richard A. Schacher
Attorney—Samuleson & Jacob

ABSTRACT: An apparatus for printing and dispensing labels temporarily adhered to a support tape by means of a pressure-sensitive adhesive, the support tape being provided with openings, such as apertures or marginal indentations, at intervals corresponding to the spacing of the leading edges of the labels, the apparatus including a transport system which intermittently advances the support tape through successive increments corresponding to the advancement of a label to bring the labels sequentially into accurate registration with a printing position and a dispensing position, the transport system having a transport roll including a peripheral feed surface, means for intermittently driving the transport roll through successive angular increments which advances the peripheral feed surface through successive increments corresponding to the advancement of a label, projections extending from the feed surface for entering the openings in the support tape with sufficient clearance to permit the support tape to engage the feed surface only when the openings are registered with the projections, and means for maintaining the support tape against a portion of the feed surface extending around the transport roll through an angle of greater than 90° to establish a frictional force between the support tape and the feed surface sufficient to assure that the support tape will be frictionally gripped and advanced by the transport roll.

INVENTORS
KURT SCHROTZ
WERNER BECKER

LABEL DISPENSING APPARATUS

The invention relates to a new transport device for the feeding of labels temporarily adhered to a support tape in label dispensing apparatus.

| U.S. Pat. No. | Patentee |
| --- | --- |
| 2,522,224 | Hedinger |
| 2,656,063 | Kafka |
| 2,802,598 | Petterson |
| 2,933,216 | Cole |
| 3,093,528 | Reich |
| 3,116,686 | Dudley |
| 3,146,149 | Silverstein |
| 3,238,080 | Schluter |
| 3,265,553 | Kind |

Label dispensing apparatus on which the new transport device can be used with advantage are, for example, those set forth in the following disclosures:

These are apparatus by which labels can be dispensed or can be applied to the objects which are to be labeled. The labels can be printed on their way from a supply roll to the dispensing point. These apparatus can be constructed as manually operated appliances or as automatically operating machines. Such machines and appliances dispense adhesive labels which usually are mounted individually end-to-end on a support tape. The labels can adhere temporarily to the support tape with spaces between them, or they can be wholly or partially separated from one another by straight scoring or by perforation. Label tapes can also be used which consist of a support tape and a continuous strip of paper adhering thereto. In such a case, the individual label must be severed from the strip of paper after the label printing operation and after the separation of the paper strip from the support tape.

In such apparatus a special problem is encountered in controlling the transport device which engages the support tape so that upon each advancement a label is brought into a precise registration at a dispensing position and, in some cases, another label is brought into a precise registration at a printing position. In the apparatus of the prior art, label tapes are used which are provided with markings for the control of the transport device, these markings being applied at intervals corresponding precisely to the distance between the leading edges of the labels. These markings are sensed mechanically by means of probes or optically by means of light beams. The precision-feed transport devices of the prior art are very expensive and susceptible to trouble.

It is an object of the invention to create for label dispensing apparatus and label imprinting and dispensing apparatus a transport device which a. Permits a precise feeding of the labels,
b. Is simple in construction,
c. Is reliable in operation,
d. Requires little space, and
e. Permits an easy, foolproof introduction of the label tape and support tape.

In an apparatus for the dispensing of pressure-sensitive labels adhered temporarily, in the form of a continuous tape or individually, to a support tape which is provided with openings in the apertures or marginal notches created at intervals corresponding to the spacing of the leading edges of the labels, this object is achieved by the fact that a transport roll which can be rotated incrementally through equal angular intervals corresponding to the angle of advancement, with projections which enter with clearance into the apertures or marginal notches, and, to achieve a sufficiently great frictional force between the support tape and the transport roll, the support tape is bent around the transport roll by an angle of more than 90°.

Advantageously, the support tape is bent around the transport roll by more than 180°.

The purpose of the projections on the circumference of the transport roll which are received within the apertures or marginal notches in the support tape is:

1. To bring the support tape into such a position in relation to the transport roll that the label being detached from the support tape at the label dispensing point is brought into precise registration with the dispensing position and, if the apparatus is also equipped with a printer for imprinting the labels, the labels are brought into precise registration with the printing position on their way to the point of dispensing, 2. To draw the leader of the support tape around the transport roll, 3. To introduce a relatively slight tension in the portion of the support tape which is still on the circumference of the transport roll but which will soon leave the transport roll, so that the following portion of the support tape will conform to the circumference of the transport roll and, as a result of the frictional force between the support tape will be driven or advanced with a relatively great traction force.

The greater the angular amount by which the support tape is bent around the transport roll and the greater the friction between the support tape and the transport roll is, the greater will be the friction force acting on the support tape and the smaller the circumference of the transport roll can be.

In order that substantially only the leading part of the portion of the support tape that is in engagement with the transport roll may be engaged by the projections on the circumference of the transport roll and the trailing portion may not be in contact with these projections, the spacing of the projections is not the same as the spacing of the apertures, holes, or marginal indentations or notches in the support tape. The spacing of the projections is about 0.1 to 0.25 mm. greater than the spacing between the apertures in the support tape. So that the projections may nevertheless be able to engage in the apertures in the support tape, these apertures are made 1 to 2 mm. longer, in the direction of advancement or transport, than the projections on the circumference of the transport roll. The apertures, notches or holes in the support tape are longer, in the direction of advancement or transport, by an amount equal to the difference in the spacing of the apertures multiplied by the number of transport roll projections simultaneously engaging in the apertures of the support tape.

The invention is further described hereinbelow with reference to the embodiments represented in the drawings, in which.

With the apparatus represented in FIGS. 1 to 4, pressure-sensitive labels 1, which are adhered end-to-end on a support tape 2, are imprinted by a printing mechanism 6 cooperating with the platen 5 on their way from the label supply roll 3 to the point of emergence 4, and for the separation of the labels 1, the support tape 2 is drawn stepwise or intermittently around a label-separating means 8, such as a roller, a sharp edge or a pin. The imprinted label 1' that is in position to be dispensed and has largely been separated from the support tape 2 is still lightly held in the apparatus by its trailing edge, while its leading edge is located beneath an elastic pressure roll 9 by which it can be rolled onto the object that is to be labeled.

The parts of the apparatus that are necessary for the printing of the labels and for the stepwise incremental transport of the labels are contained in a narrow housing 10 which is provided with a rigid, hollow handle 11 into which a hand lever 13 can be drawn against the force of a spring 14 which is mounted on the housing so as to be able to pivot about the shaft 12. When the hand lever 13 is depressed into the handle, the adjustable printing mechanism 6, which is fastened to a lateral arm 15 joined to hand lever 13, is moved against the platen 5 over which the label tape 1, 2, is guided, and thus imprints a label 2 which is in the printing mechanism 6 against the platen 5, a rocker arm 16 swings out, which in the rest position of the apparatus urges an inking pad 17 against the set printing type of the printing mechanism 6. Such apparatus are known from U.S. Pat. No. 3,265,553.

In the transport system constructed according to the invention, use is not made, as it has hitherto, of two rolls between which the support tape is guided; instead, the transport system consists essentially of only one transport roll 7, around which the support tape 2 is bent by at least 90° and preferably by more than 180°, and which drives the support tape when it rotates, doing so essentially on the basis of friction forces. When the hand lever 13 is squeezed into the handle 11, a transport pawl 19, which is connected to hand lever 13 and can pivot about the axis 18, is moved forward in such a manner that the tooth 20 of transport pawl 19 passes over a pin 21 fastened to the transport roll 7, so that, when the hand lever 13 is released, it swings back out under the action of the spring 14 and the transport pawl rotates the transport roll 7 through angular displacement which causes the label tape to advance one label. The drive pins 21 are arranged concentrically along a circle on a side surface of the transport roll 7 and disposed parallel to the axis of rotation 22 of roll 7.

As shown especially in FIGS. 4 to 7, the transport roll 7 is provided on its periphery with projections 25 or 25′, which engage with clearance in marginal indentations 26 or apertures 26′ in the support tape 2. Support tape 2 is bent around the transport roll 7 by an angle of more than 180°.

The transport roll 7 is driven intermittently by the transport pawl 19 by an always equal angular amount corresponding to the spacing or division of the projections 25 or 25′ on the periphery of the transport roll 7. Since the support tape 2, in spite of slight dimensional inaccuracies, aligns itself about the transport roll 7 in a predetermined manner, a precise advancement of the labels is assured.

The transport roll 7 transmits the feeding force to the support tape 2 by friction. Therefore, the tape wraparound angle should be as great as possible. The transport roll 7 is furthermore provided with a covering 27 of silicone rubber having a high coefficient of friction relative to the support tape 2. The greater the wraparound angle is and the greater the coefficient of friction between the support tape and the periphery of the transport roll 7 is, the smaller the diameter of the transport roll 7 can be.

Figure 1:
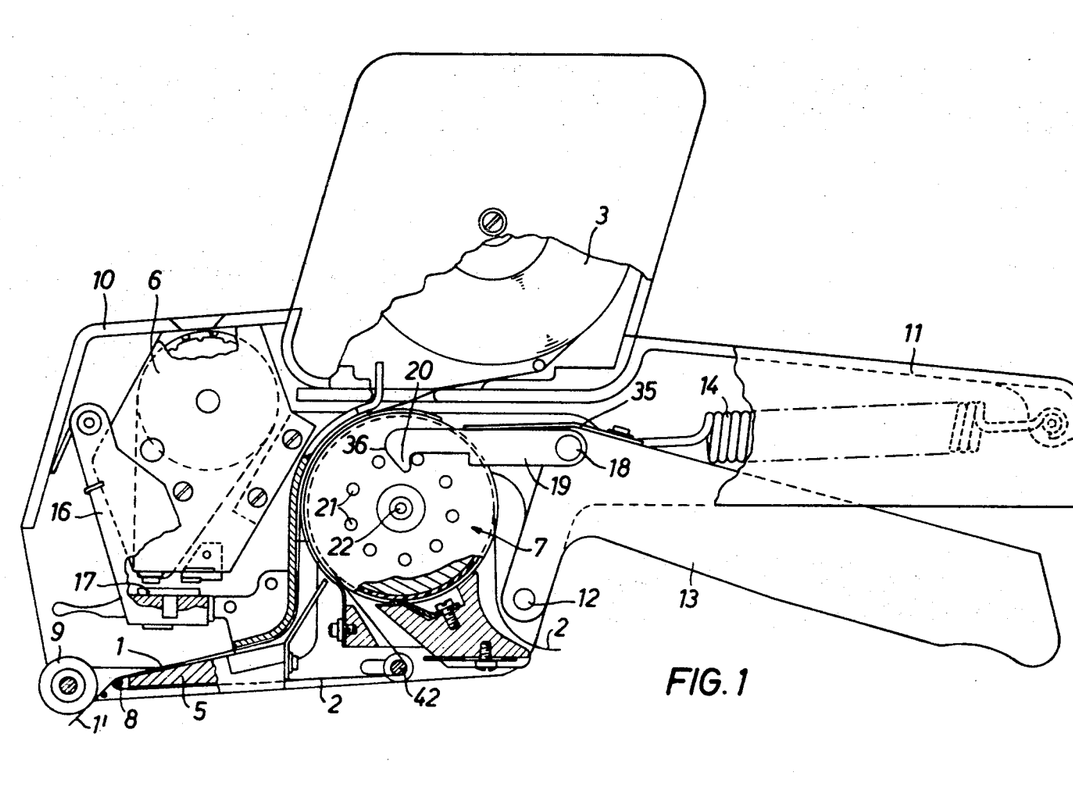
FIG. 1 is a side elevational view, partially sectioned, of a manually operated appliance for the printing, dispensing and application of labels, using the label transport system according to the invention.
Figure 2:
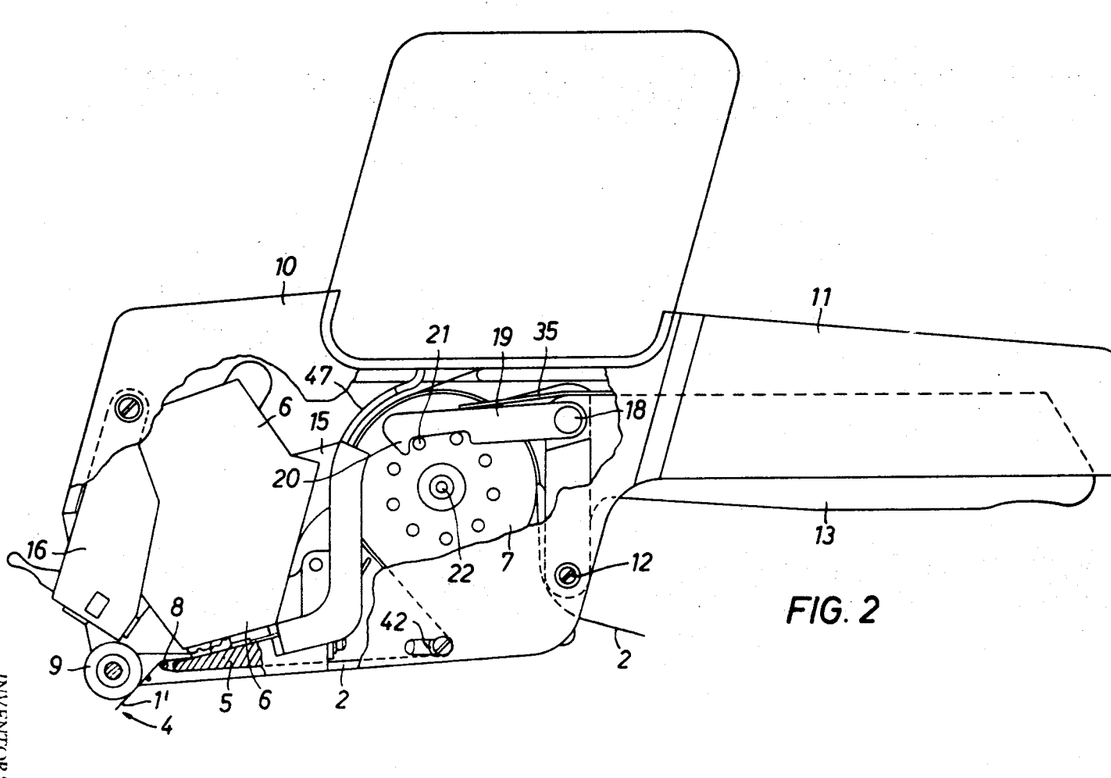
FIG. 2 is a view similar to FIG. 1, in which the hand lever is shown in the depressed position.
Figure 3:
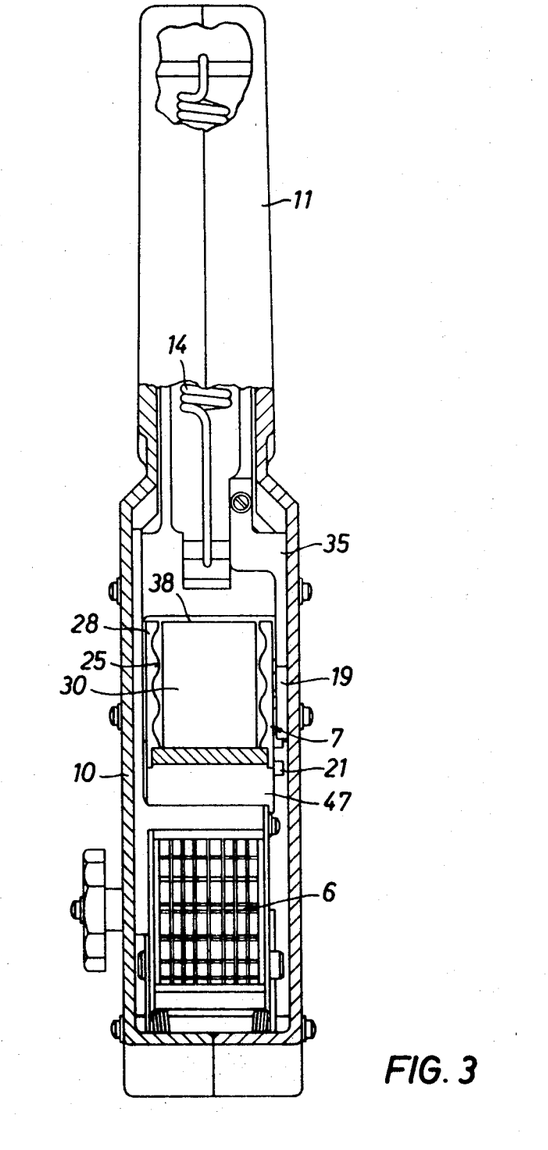
FIG. 3 is a top plan view, partially sectioned, of the appliance.
Figure 4:
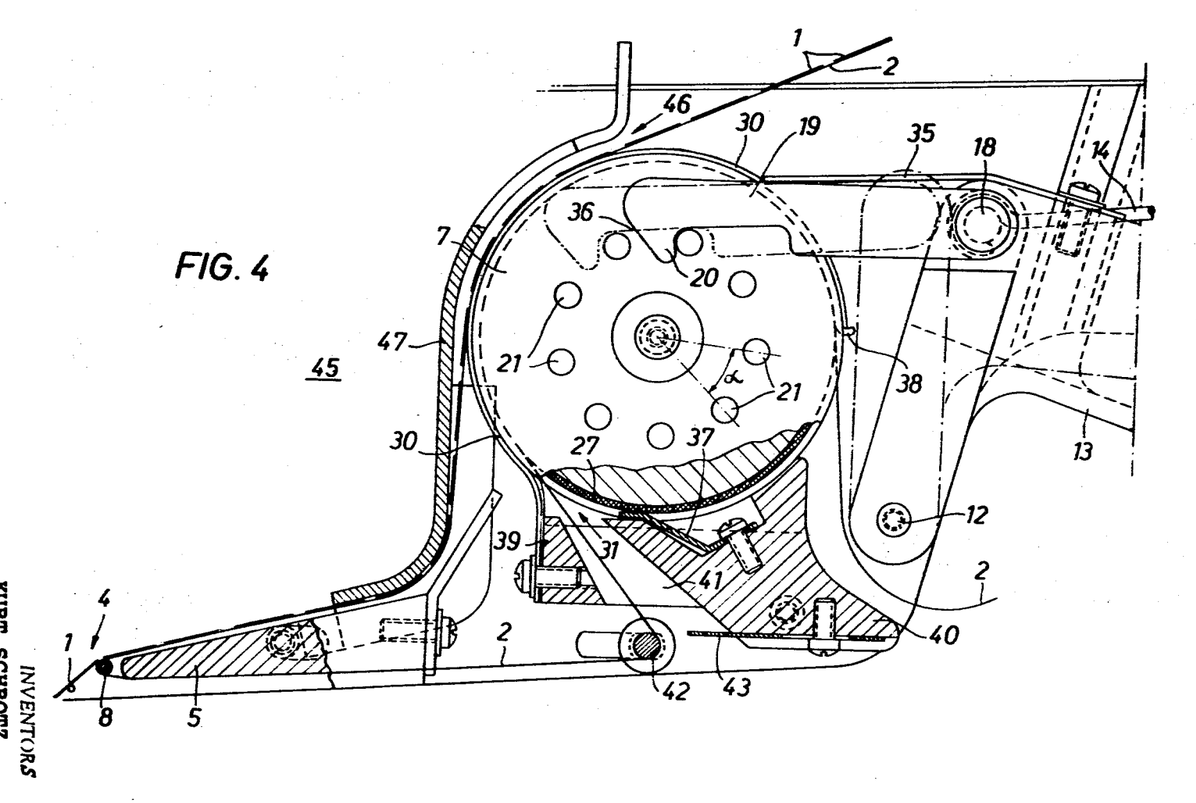
FIG. 4 is a side elevation of the new transport device.

As shown especially by FIG. 4, the support tape 2 is pressed by a guide surface 30 against the periphery of the transport roll 7. This guide surface 30 forms, together with the transport roll 7, a funnellike entrance 31 for the support tape 2. The funnellike entrance 31 facilitates the introduction of the support tape 2. The guide surface 30 is formed by a strip of sheet steel which envelops the transport roll 7 by more than 180° and at its free end 38 presses the support tape 2 resiliently against the circumference of the transport roll.

Pins 21 are concentrically arranged on one lateral surface of the transport roll 7 coaxially with the axis of rotation 22 of roll 7, in accordance with the angular division of the projections 25 engaging the support tape 2. These pins 21 cooperate with the pivoting transport pawl 19, which under the control of the hand lever 13 is advanced tangentially to the circle of pins 21 and back again in each working cycle, the amount of the advance being only slightly greater than the distance between two neighboring pins. In this movement the transport roll is revolved by one angular division α.

The transport pawl 19 is connected to hand lever 13, which can be pivoted against the force of spring 14 into the handle 11. The pivot axis 12 is located at such a distance below a straight line connecting the pivot axis 18 of pawl 19 to the particular pin 21 that is to be engaged, that when the hand lever 13 is pivoted into the handle 11, the tooth 20 of pawl 19 is pushed beyond the next pin 21. The transport pawl is urged against the pins 21 by a leaf spring 35. The tooth 20 engaging in each case between two pins 21 has a slant or chamfer on its extremity 36 so that, when pawl 19 is pushed forward, it climbs up over the pin 21 that is to be engaged in each case. To prevent the transport roll 7 from turning backwards when this happens, it is held by a constantly applied resilient drag shown in the form of a leaf spring drag 37. Drag 37 is adjustable as to its braking action. The leaf spring drag 37, whose free resilient end faces in the direction of transport and is applied tangentially to the transport roll 7, serves as the drag. Since the transport roll 7 has a coating 27 of silicone rubber on its periphery, the transport roll 7 is only lightly retarded in the direction of transport, and is strongly retarded in the opposite direction, by drag 37. The leaf spring drag 37 is affixed to a body 40 made of plastic and affixed to the frame or housing 10. Body 40 has a funnellike passage 41 for the support tape 2. The strip of sheet metal 30 serving as a guide surface is fastened to the front end 39 of body 40.

Under the axis 22 of the transport roll 7 and under the passageway 41 in body 40 there is provided an adjustable guide pin 42 around which the support tape 2 coming from the label dispensing point is turned by about 120° and fed to the transport roll 7. By the adjustment of this guide pin 42 it is possible to adjust the position of the labels 1 at the point of issue 4 and on the printing platen 5. In back of the guide pin 42, a label catching plate 43 is provided on body 40; this plate is adjustable in relation to pin 42 and serves to catch any labels which, contrary to the general rule, might still be adhering to the support tape 2.

A narrow passageway 46 following the contour of the transport roll 7 separates the transport roll 7 from the space 45 in which the printing mechanism 6 is contained. In the embodiment illustrated, the passageway 46 is defined by the steel plate 30 and a rigid wall 47. The passageway 46 can also be formed by an appropriately shaped part made of plastic, whose wall adjacent the transport roll serves the functions of the steel plate 30. The passageway 46 leads the label tape over the transport roll and maintains the label tape out of contact with the feed surface of the transport roll. When the label tape is inserted, the leading end of the label tape can be pushed through this passageway 46 over the transport roll 7 and over the printing platen 5 to the point 4 at which the labels are dispensed. Then the leading end of tape 2 can be pulled on out and a number of labels 1 can be removed from the support tape 2 and the leading end of the support tape can then be introduced into the funnel-shaped entrance 31, 41. By operating the hand lever 13 and rotating the transport roll 7 step by step, the support tape 2 is passed around the transport roll 7 between the transport roll and the steel plate 30 until it leaves the transport roll at a point beyond the elastically applied extremity 38 of steel plate 30. When the support tape 2 is thus introduced, it should be without any tension, forming a loose loop between the point of label issuance and the transport roll 7. Not until the leading end of the support tape 2 comes away from the transport roll 7 at 38 may the support tape 2 have the tension necessary in operation.

Figure 5:
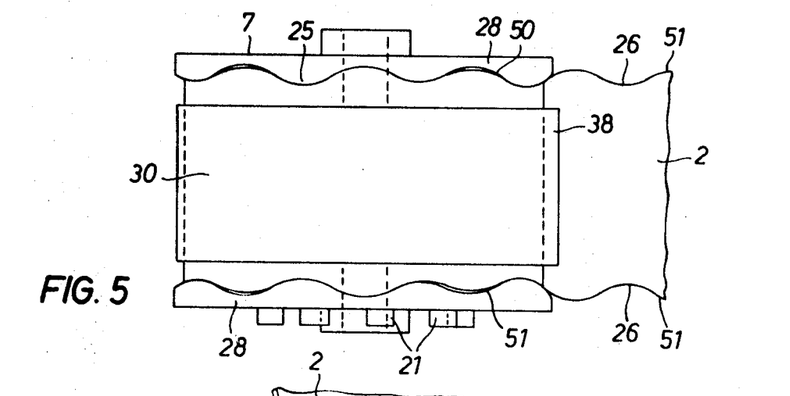
FIG. 5 is a top view of the transport roll of FIG. 4.

As shown in FIG. 5, the projections 25 on the periphery of the transport roll 7, which engage in the marginal indentations 26 in the support tape 2, are formed by a wavy profile 50. The edges 51 of the support tape as well as the profile 50 which forms the projections 25 are in the shape of a shallow sinusoidal line. The guide surface 30, which holds the support tape 2 in engagement with the projections 25 in the transport roll 7, is disposed between the marginal shoulders 28 of roll 7.

Figure 6:
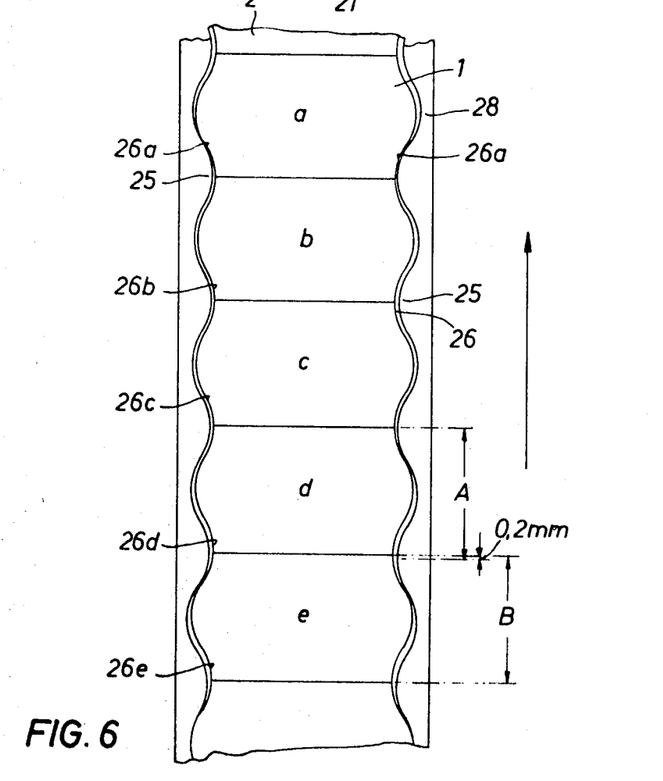
FIG. 6 is a development of the circumference of the transport roll showing a label tape fitting this transport roll.

FIG. 6 shows a development of the periphery of the transport roll 7 with a label tape fitting this roll 7. Even though it is only the support tape 2 that is wrapped around transport roll 7, the support tape 2 is represented in the drawing with labels 1 adhering thereto, as an aid in the comprehension of the operation of the transport roll 7. The labels 1 are identified by the letters a, b, c, d and e. The marginal indentations 26a which belong to label a, and which are leading in the direction of transport and will separate from the transport roll 7 in the next advancing movement, have their edges in contact with the projections 25 of the transport roll 7.

Each projection 25 is capable of about 1 mm. of displacement longitudinally of the support tape in relation to a marginal indentation 26; in other words, the marginal indentations, measured lengthwise of the support tape 2, are about 1 mm. longer than the projections 25 which engage into these indentations 26. On the other hand, the division or spacing A of the centers of projections 25 is 0.2 mm. greater than the division or spacing B of the centers of the marginal indentations 26.

On both sides of the support tape 2, in the case of an envelopment angle of 180°, five projections 25 engage into the marginal indentations 26a, 26b, 26c, 26d and 26e. Only the projections 25 that are leading in the direction of transport directly contact the edges of the marginal indentations 26a and exercise a relatively light traction effort on the support tape 2. Inasmuch as the projections 25 are 5 × 0.2 mm. = 1 mm. shorter than the indentations, the projections 25 of roll 7 can engage without interference into the indentations in support tape 2 in spite of the 0.2 mm. of difference in the spacing.

The slight tension introduced in the support tape 2 by the projections 25 engaging the marginal indentations 26a does not, of course, suffice to pull the support tape 2 forward for the transport of a label 1. The pulling force necessary for the transport is induced in the support tape 2 by the fact that the above-described slight initial force serves to bring the support tape 2 into full contact with the periphery of the transport roll 7, and this enables the transport roll 7 to transport the tape by friction. In the next feed or working cycle, label b assumes the position of label a, and the projections 25 press against the edges of the indentations 26b. In the present embodiment, the length of the labels is precisely equal to the spacing B of the centers of the tape indentations 26, because the labels 1 are mounted on the support tape 2 without any space between them.

Figure 7:
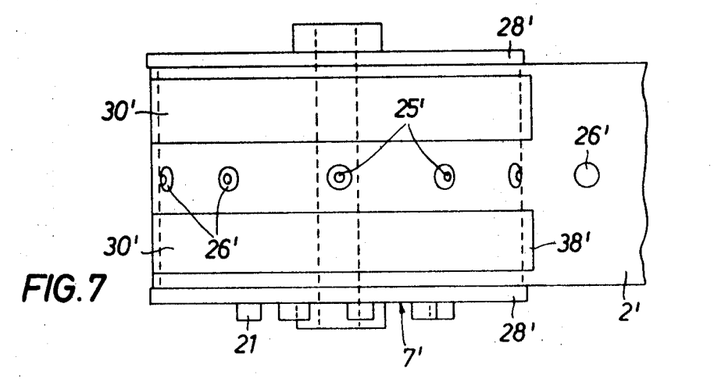
FIG. 7 is a top view of another embodiment of the transport roll.
Figure 8:
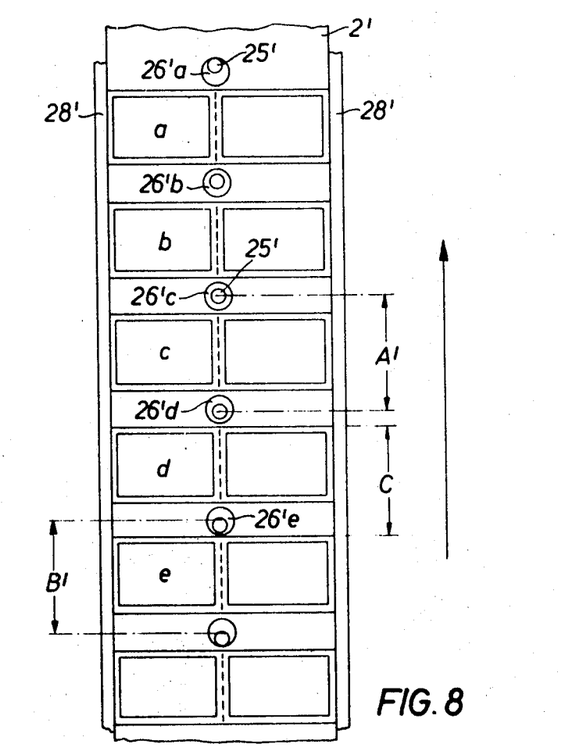
FIG. 8 is a development of the circumference of the transport roll of FIG. 7 showing a label tape fitting same.

FIGS. 7 and 8 show a modified embodiment of the invention in the same manner as FIGS. 5 and 6. Parts having the same functions have the same reference marks as in FIGS. 5 and 6, but are followed by a prime ('). The support tape 2' is provided with holes 26' which are arranged at intervals B' corresponding to the spacing C of the front edges of the labels 1'. These holes 26' in the support tape 2' are engaged by projections 25' on the transport roll 7'. These projections are from 1 to 2 mm. smaller than holes 26'. On the other hand, the spacing A' of projections 25' is approximately 0.1 to 0.25 mm. larger than the spacing B' of holes 26'. Consequently only the projection 25' that is foremost in the direction of transport (see the arrow) pulls on the support tape 2, while the other projections 25' of roll 7' enter into holes 26' b, 26'c, 26'd, 26'e, but they do not exert any pulling effort on the support tape 2'. The driving of the support tape 2' here again is produced essentially by the friction or adhesion between the support tape and the transport roll. The labels 1' are double labels, which are divided by a scored line. In the instant embodiment, the support tape 2' is kept in engagement with the projections 25' or transport roll 7' by two guiding surfaces 30'.

Also, for the better guidance of the support tape 2', the transport roll 7' can be provided with marginal flanges 28'.

It has been found that, in the case of labels which have a length of 10 to 30 mm. in the direction of transport, the difference between the spacing of the centers of projections 26 on roll 7 and the spacing of the centers of the holes or indentations in the support tape can range from 0.1 to 0.25 mm., and accordingly the projections can have a length in the direction of transport that is 0.5 to 2 mm. smaller than the corresponding holes or indentations in the support tape.

The above detailed description of embodiments of the invention is provided by way of example only. Various details of design and construction may be modified without departing from the true spirit and scope of the invention.

The embodiments of the invention in which an exclusive property or privilege is claimed are defined as follows:

1. Apparatus for the printing and dispensing of labels temporarily adhered to a support tape by means of a pressure-sensitive adhesive, the support tape being provided with openings, such as apertures or marginal indentations, at intervals corresponding to the spacing of the leading edges of the labels, the apparatus including a transport system which intermittently advances the support tape through successive increments corresponding to the advancement of a label to bring the labels sequentially into accurate registration with a printing position and a dispensing position, said transport system comprising;

a transport roll including a peripheral feed surface, means for intermittently driving the transport roll through successive angular increments which advance the peripheral feed surface through successive increments corresponding to the advancement of a label;

a plurality of projections extending from the feed surface and being receivable within the openings in the support tape for permitting the support tape to engage the feed surface only when the openings are registered with the projections;

means for maintaining the support tape against a portion of the feed surface extending throughout an angle of greater than 90° such that a feeding force is transmitted from the feed surface to the support tape by friction and the support tape will be advanced with the advancement of the feed surface by the frictional feeding force between the support tape and the feed surface of the transport roll.

2. The apparatus of claim 1 wherein the means for mounting the support tape against a portion of the feed surface maintains the support tape against a portion of the feed surface extending throughout an angle of greater than 180°.

3. The apparatus of claim 1 wherein the feed surface is comprised of a material, such as silicone rubber, which has a high coefficient of friction relative to that of the support tape.

4. The apparatus of claim 1 wherein the openings in the support tape are holes arranged at equal intervals along the center line of the support tape and the projections are smaller in the direction of the advancement of the tape than are the holes in the support tape, the spacing between adjacent projections being greater than the corresponding spacing between the holes in the support tape.

5. The apparatus of claim 4 including opposite marginal shoulders on the periphery of the transport roll between which is guided the support tape.

6. The apparatus of claim 1 wherein the openings in the support tape are in the form of marginal indentations having a predetermined profile and the projections on the transport roll have a matching profile, the dimensions of the profiles being such that there is clearance in the direction of the advancement of the support tape, and the spacing between adjacent projections is slightly greater than the corresponding spacing between adjacent indentations in the support tape.

7. The apparatus of claim 6 wherein the transport roll includes continuous marginal flanges and the projections are a part of the continuous marginal flanges.

8. The apparatus of claim 1 wherein the means for maintaining the support tape against a portion of the feed surface includes a guide surface partially enveloping the transport roll.

9. The apparatus of claim 8 wherein the guide surface includes a funnellike entrance for the support tape and envelopes the transport roll by at least 180°.

10. The apparatus of claim 8 wherein the guide surface is provided by a strip of sheet steel resiliently biased toward the feed surface.

11. The apparatus of claim 10 wherein the strip of sheet metal is mounted for pivotal movement away from the transport roll.

12. The apparatus of claim 1 wherein the means for intermittently driving the transport roll includes
- a plurality of pins disposed concentrically and coaxially with the axis of rotation of the transport roll on a lateral surface thereof and spaced from one another along a circle at an angular spacing corresponding with the angular spacing of the projections;
- a transport pawl; and
- operating means for advancing and retracting the transport pawl tangential to the circle on which said pins are located by a displacement that is only slightly greater than the distance between adjacent pins for each operation of the operating means.

13. The apparatus of claim 12 wherein the operating means includes a hand lever mounted for pivotal movement about an axis, and the transport pawl is pivotally mounted upon the hand lever at a further axis, the pivotal axis of the hand lever being located at a distance from a straight line connecting the further axis to the particular pin which is to be engaged by the transport pawl.

14. The apparatus of claim 13 including
- a spring resiliently biasing the transport pawl against the pins;
- a tooth on said transport pawl normally falling between two adjacent pins and including a chamfered end face for raising the transport pawl over a corresponding pin when the pawl is advanced toward that pin; and
- an adjustable drag for holding the transport roll stationary as the transport pawl is so advanced.

15. The apparatus of claim 1 wherein the openings in the support tape are in the form of marginal indentations having a wavelike profile and the projections on the periphery of the transport roll have a corresponding wavelike profile.

16. The apparatus of claim 15 wherein the wavelike profile of the margins of the support tape and the corresponding wavelike profile of the projections have the form of a shallow sinusoidal line.

17. The apparatus of claim 1 including
- a printing mechanism at said printing position;
- means for holding a supply of the support tape with the labels thereon above the transport roll and the printing mechanism; and
- a passageway leading downwardly between the printing mechanism and the transport roll for guiding the support tape with the labels thereon to the printing position.

18. The apparatus of claim 17 wherein the printing mechanism includes a printing platen at the printing position and the guideway includes a funnel-shaped entrance and extends to the printing platen.

19. The apparatus of claim 18 including a guide pin located below the axis of rotation of the transport roll for guiding the support tape from the printing position to the transport roll.

20. The apparatus of claim 19 including a label-catching plate mounted for adjustment relative to the guide pin and located between the guide pin and the transport roll such that any labels adhering to the support tape beyond the guide pin will be caught by the label-catching plate.

UNITED STATES PATENT OFFICE
CERTIFICATE OF CORRECTION

Patent No. 3,611,929          Dated October 12, 1971

Inventor(s) KURT SCHROTZ and WERNER BECKER

It is certified that error appears in the above-identified patent and that said Letters Patent are hereby corrected as shown below:

The table of patents found in column 1 should be placed after the paragraph of lines 19-21, rather than before.

Signed and sealed this 28th day of March 1972.

(SEAL)
Attest:

EDWARD M. FLETCHER, JR.         ROBERT GOTTSCHALK
Attesting Officer               Commissioner of Patents